United States Patent
Carus

(10) Patent No.: US 10,474,958 B2
(45) Date of Patent: Nov. 12, 2019

(54) APPARATUS, SYSTEM AND METHOD FOR AN ADAPTIVE OR STATIC MACHINE-LEARNING CLASSIFIER USING PREDICTION BY PARTIAL MATCHING (PPM) LANGUAGE MODELING

(71) Applicant: Information Extraction Systems, Inc., Waban, MA (US)

(72) Inventor: Alwin B Carus, Waban, MA (US)

(73) Assignee: Information Extraction Systems, Inc., Waban, MA (US)

( * ) Notice: Subject to any disclaimer, the term of this patent is extended or adjusted under 35 U.S.C. 154(b) by 962 days.

(21) Appl. No.: 14/982,082

(22) Filed: Dec. 29, 2015

(65) Prior Publication Data
US 2016/0232455 A1    Aug. 11, 2016

Related U.S. Application Data

(60) Provisional application No. 62/098,522, filed on Dec. 31, 2014.

(51) Int. Cl.
*G06N 7/00*     (2006.01)
*G06F 17/27*    (2006.01)

(52) U.S. Cl.
CPC ......... *G06N 7/005* (2013.01); *G06F 17/2715* (2013.01)

(58) Field of Classification Search
None
See application file for complete search history.

(56) References Cited

U.S. PATENT DOCUMENTS

| 8,024,176 B2 | 9/2011 | Carus et al. | |
| 2014/0019118 A1* | 1/2014 | Tromp | G06F 17/274 704/9 |
| 2015/0254566 A1* | 9/2015 | Chandramouli | G06F 17/27 706/11 |

OTHER PUBLICATIONS

Bobicev et al., An Effective and Robust Method for Short Text Classification, 2008, Proceedings of the Twenty-Third AAAI Conference on Artificial Intelligence, pp. 1444-1445 (Year: 2008).*

(Continued)

*Primary Examiner* — Alan Chen
(74) *Attorney, Agent, or Firm* — Schmeiser, Olsen & Watts LLP

(57) ABSTRACT

We have invented a process and method for creating a general-purpose adaptive or static machine-learning classifier using prediction by partial matching (PPM) language modeling. This classifier can incorporate homogeneous or heterogeneous feature types; variable-size contexts; sequential or non-sequential features. Features are ordered (linearized) by information saliency; and truncation of least-informative context is used for backoff to handle previously unseen events. Labels may be endogenous (from within the group) or exogenous (outside the group) of the feature types. Classification may generate labels and their probabilities; or only labels. Classification stores may be complete or minimized where redundant states are removed producing significant space savings and performance improvements. Classifiers may be static (unchanging) or online (adaptive or updatable incrementally or in batch). PPM classifiers may be incorporated in ensembles of other PPM classifiers or different machine learning algorithms. Training and prediction algorithms are both simple and efficient; and permit multiple implementations using standard software data structures. These benefits are achieved while providing state-of-the-art prediction performance.

22 Claims, 11 Drawing Sheets

(56) References Cited

OTHER PUBLICATIONS

Burbey et al., Predicting Future Locations Using Prediction-by-Partial-Match, 2008, ACM, pp. 1-6 (Year: 2008).*
"ID3 algorithm." (2014). Wikipedia. http://en.wikipedia.org/wiki/ID3_algorithm.
"C4.5 algorithm." (2014). Wikipedia. http://en.wikipedia.org/wiki/C4.5_algorithm.
"Decision tree learning." (2014). Wikipedia. http://en.wikipedia.org/wiki/Decision_tree_learning.
"Prediction by partial matching." (2014). Wikipedia. http://en.wikipedia.org/wiki/Prediction_by_partial_matching.
J. Cleary, I. Witten. (1984). "Data compression using adaptive coding and partial string matching." IEEE Transactions on Communications, vol. COM-32, Apr. 1984.
A. Moffat. (1990). "Implementing the ppm data compression scheme." IEEE Transactions on Communications, vol. 38, No. 11, Nov. 1990.
W. Daelemans, A. van den Bosch, T. Weijters. (1997). "IGTree: Using Trees for Compression and Classification in Lazy Learning Algorithms." Artificial Intelligence Review—Special issue on lazy learning archive. vol. 11. Issue 1-5, Feb. 1997.
W. Fisher. (1999). "A statistical text-to-phone function using ngrams and rules." Proceedings of the IEEE International Conference on Acoustics, Speech, and Signal Processing, 1999.
W. Teahan. (2001). "Combining PPM models using a text mining approach." Proceedings of the Data Compression Conference, 2001.
W. Teahan. J. Cleary. (1996). "The entropy of English." Proceedings of the Data Compression Conference, 1996.
W. Teahan. D. Harper. (2001). "Combining PPM models using a text mining approach." Proceedings of the Data Compression Conference, 2001.
W. Teahan. S. Inglis. J. Cleary. G. Holmes. (1998). "Correcting English text using PPM models." Proceedings of the Data Compression Conference, 1998.
W. Teahan. (2000). "Text classification and segmentation using minimum cross-entropy." Proceedings of the RIAO Conference, 2000.
W. Teahan. D. Harper. (2003). "Using compression-based language models for text categorization." Language Modeling for Information Retrieval.
W. Teahan. J. Cleary. (1997). "Applying compression to natural language processing." SPAE: The Corpus of Spoken Professional American-English.
D. Hunnisett. W. Teahan. (2004). "Context-based methods for text categorisation." Proceedings of the 27th annual international ACM SIGIR conference on Research and development in information retrieval, 2004.
D. Thomas, W. Teahan. (2007). "Text categorization for streams." Proceedings of the 30th annual international ACM SIGIR conference on Research and development in information retrieval, 2007.
I. Witten, Z. Bray, M. Mahoui, W. Teahan. (1999). "Using language models for generic entity extraction." Proceedings of the International Conference on Machine Learning Workshop on Text Mining, 1999.
W. Teahan. Y. Wen, R. McNab, I. Witten. (2000). "A compression-based algorithm for Chinese word segmentation." Computational Linguistics. 2000.
I. Witten, Z. Bray, M. Mahoui, W. Teahan. (1999). "Using language models for generic entity extraction." CML-99 Workshop on Machine Learning in Text Data Analysis. 16th International Machine Learning Conference, 1999.
W. Teahan, Y. Wen, R. McNab, I. Witten. (1999) "A compression-based algorithm for Chinese word segmentation." University of Waikato (Hamilton, NZ) working papers.
S. Yeates, D. Bainbridge, I. Witten. (2000). "Using compression to identify acronyms in text" arXiv:cs/0007003.
S. Yeates. (2001). "The Relationship between Hidden Markov Models and Prediction by Partial Matching Models." Eighth Annual New Zealand Engineering and Technology Postgraduate Conference.
S. Yeates. (2006). "Text Augmentation: Inserting markup into natural language text with PPM Models." Ph.D. Thesis. University of Waikato, Department of Computer Science.
K. Heafield. (2003). "KenLM: faster and smaller language model queries." WMT '11 Proceedings of the Sixth Workshop on Statistical Machine Translation, 2003.
J. Bilmes, K. Kirchhoff. (2003). "Factored language models and generalized parallel backoff." Proceedings of the 2003 Conference of the North American Chapter of the Association for Computational Linguistics on Human Language Technology, 2003.
A. can den Bosch, T. Bogers. "Efficient Context-sensitive Word Completion for Mobile Devices." (2008). Proceedings of the 10th international conference on Human computer interaction with mobile devices and services, 2008.

* cited by examiner

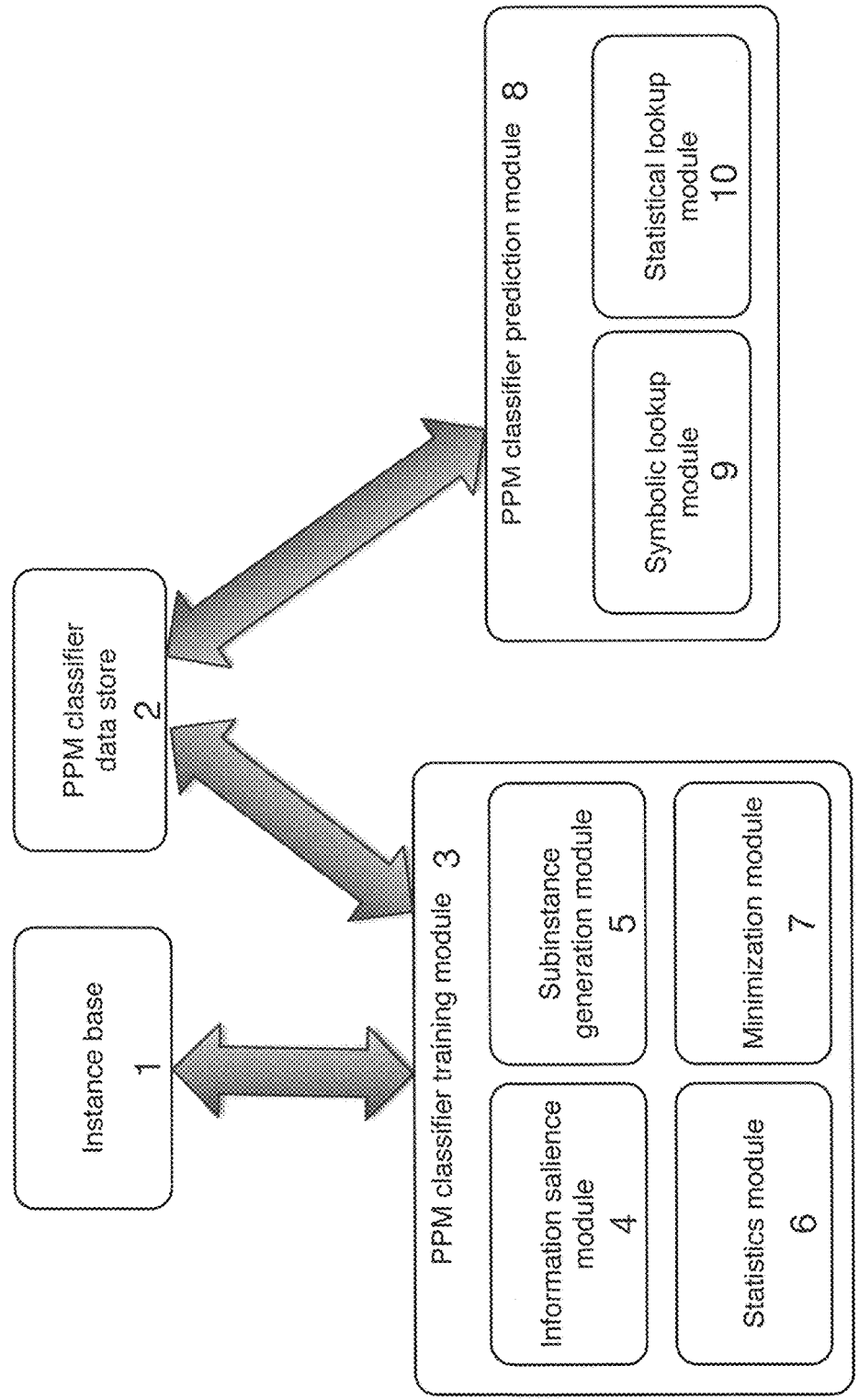

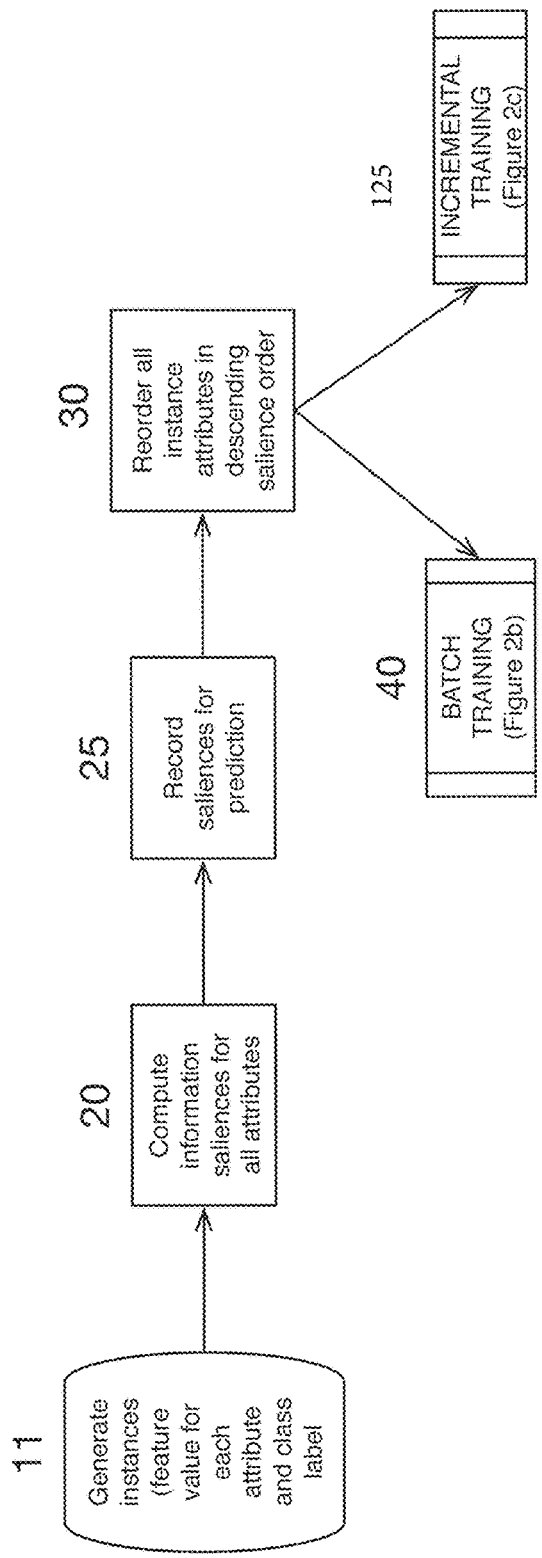
Figure 2a: PPM classifier training, instance computation

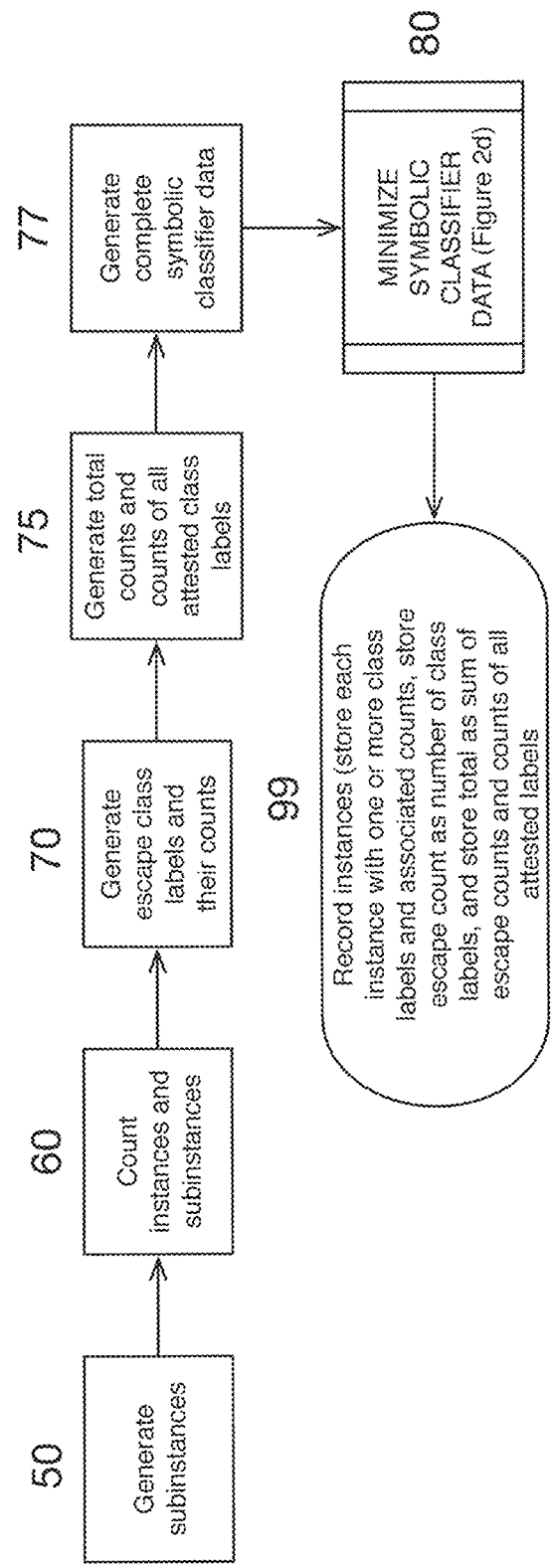

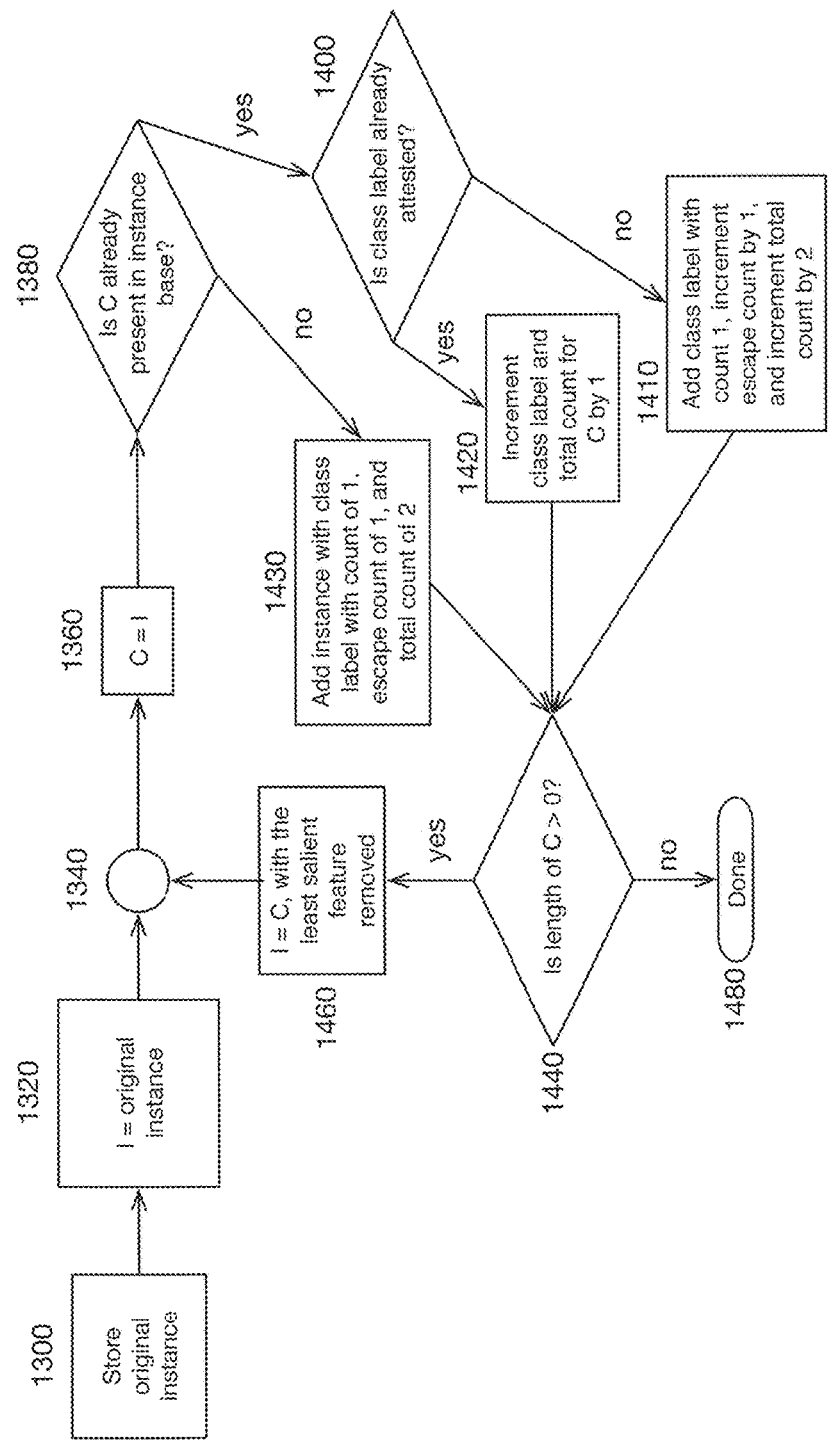
Figure 2c: Incremental PPM classifier training

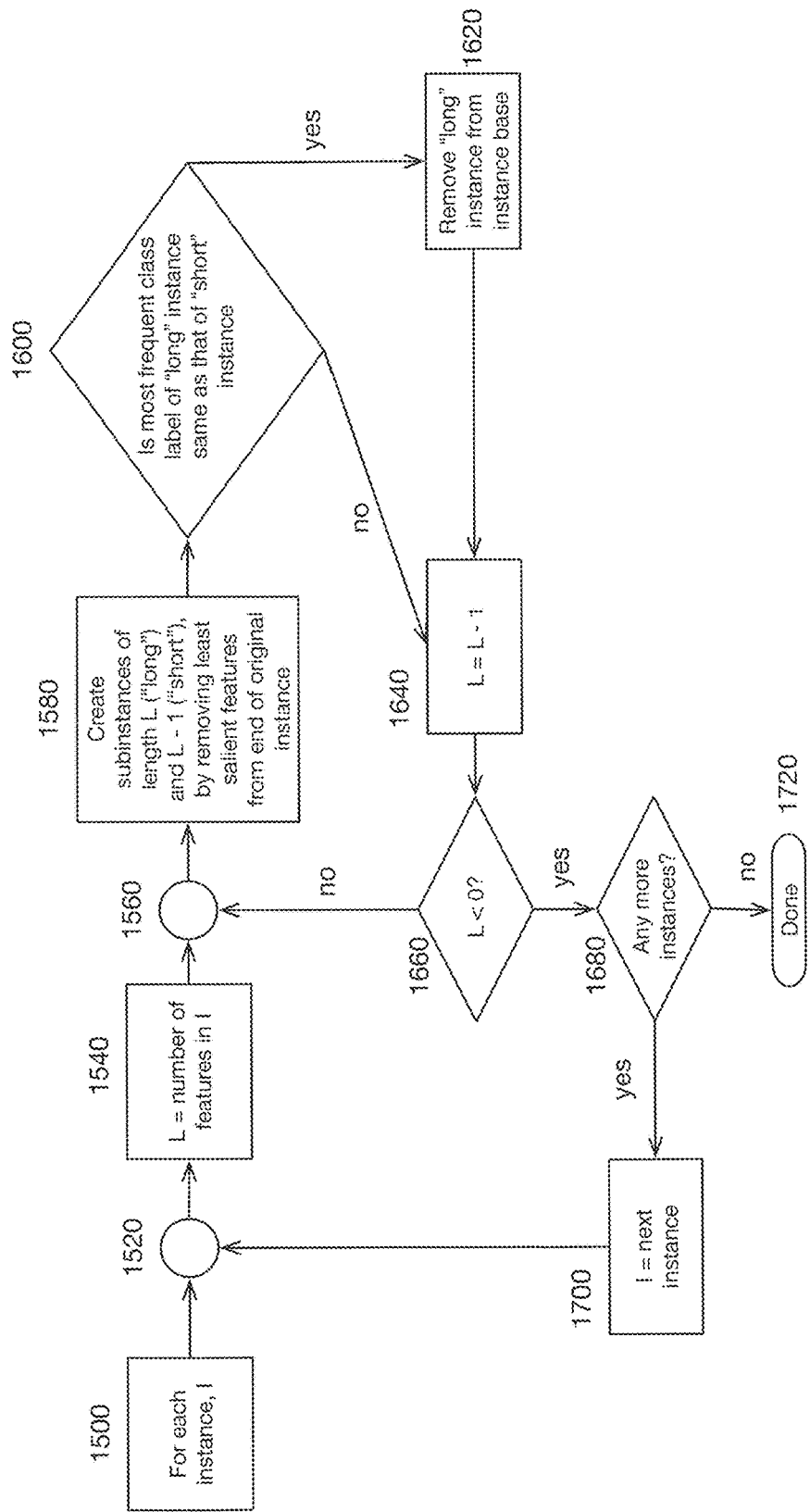

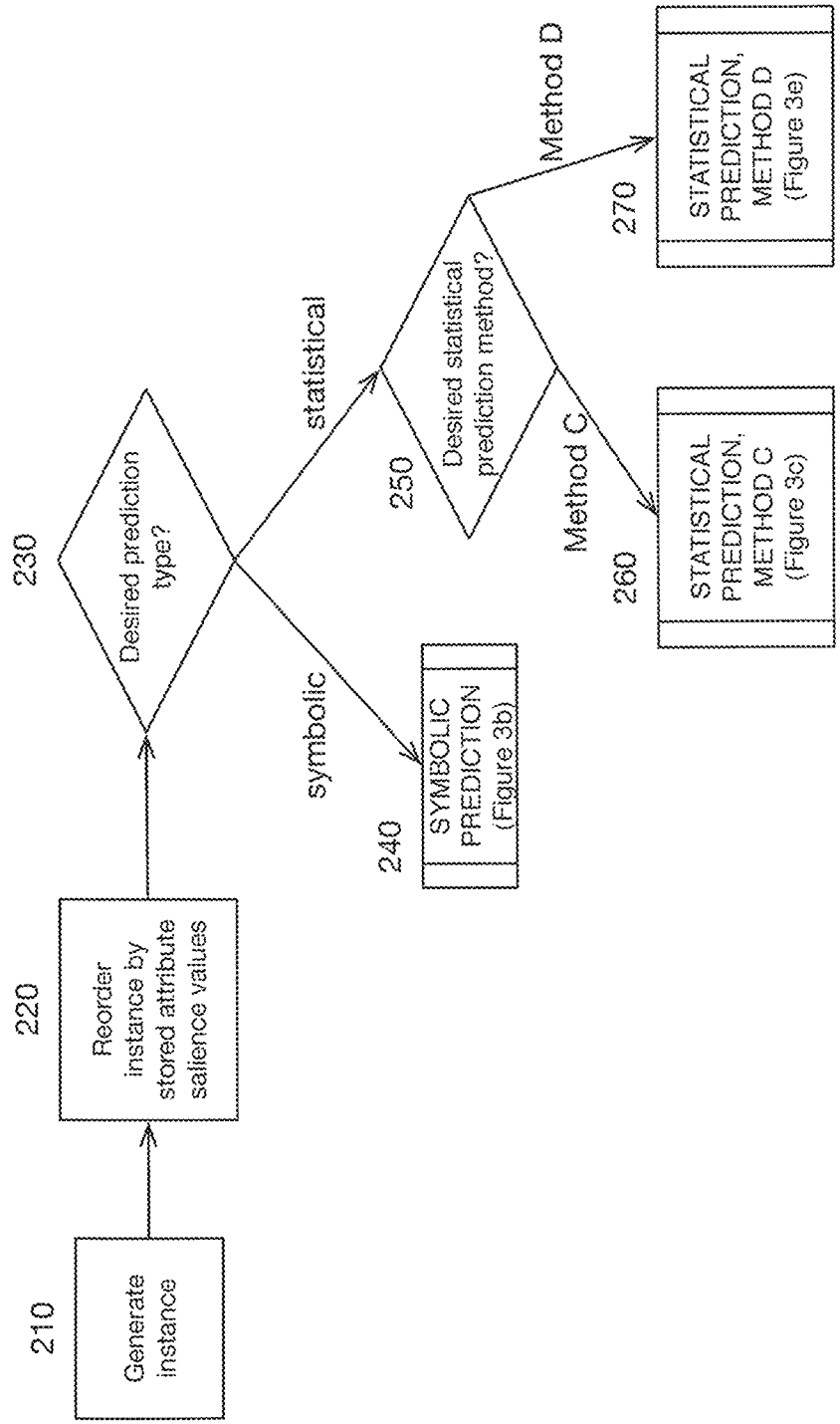
Figure 3a: PPM classifier prediction

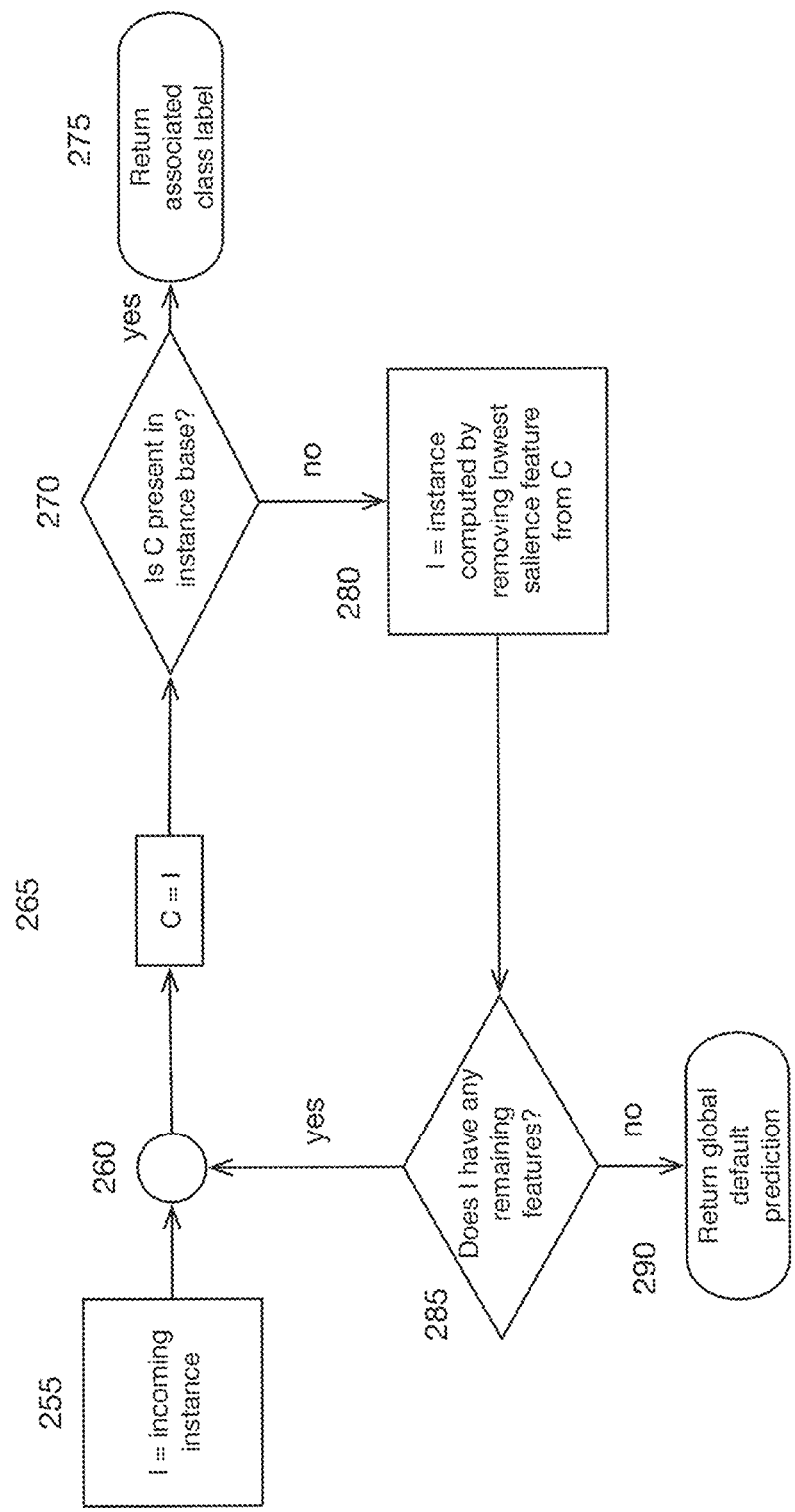

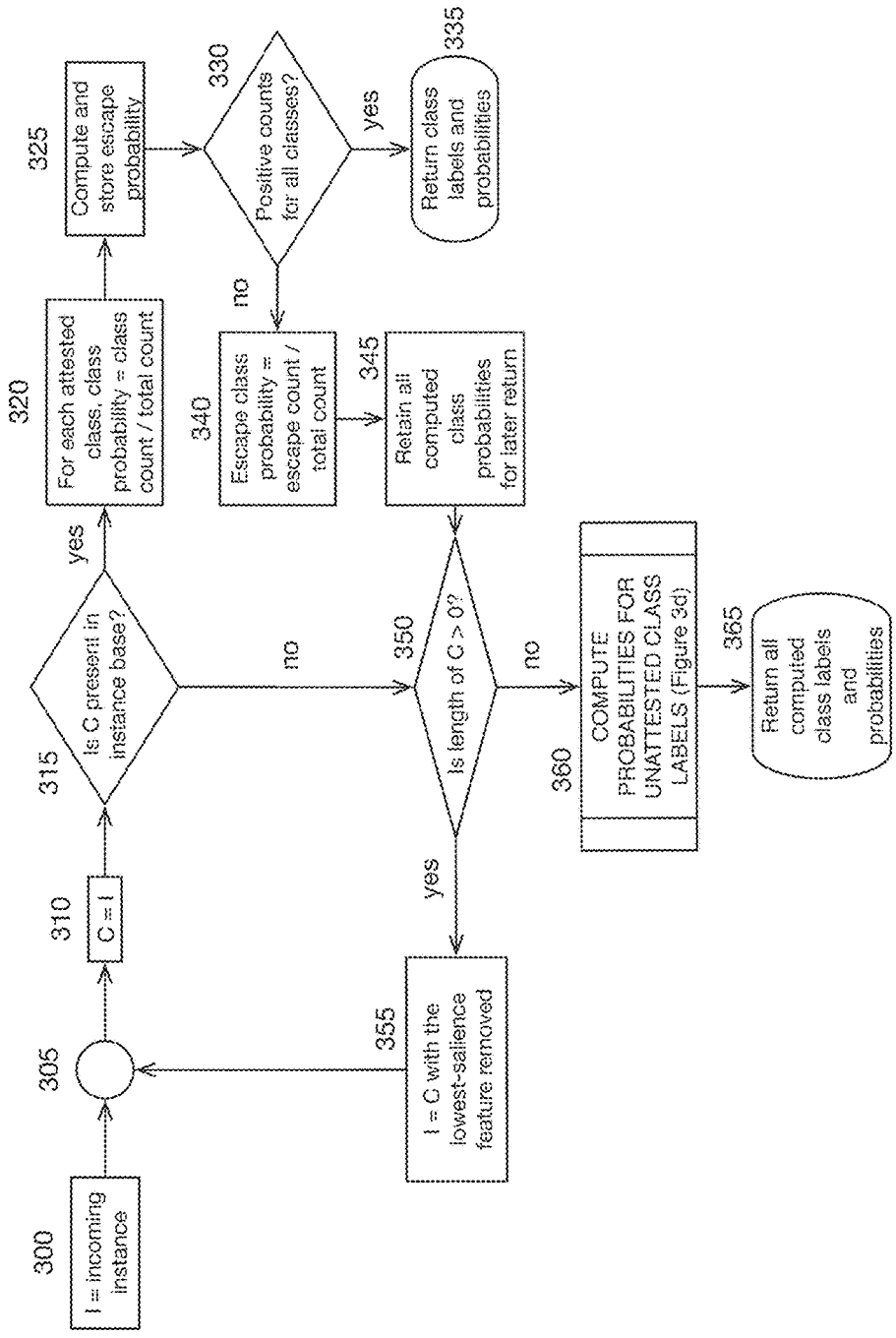

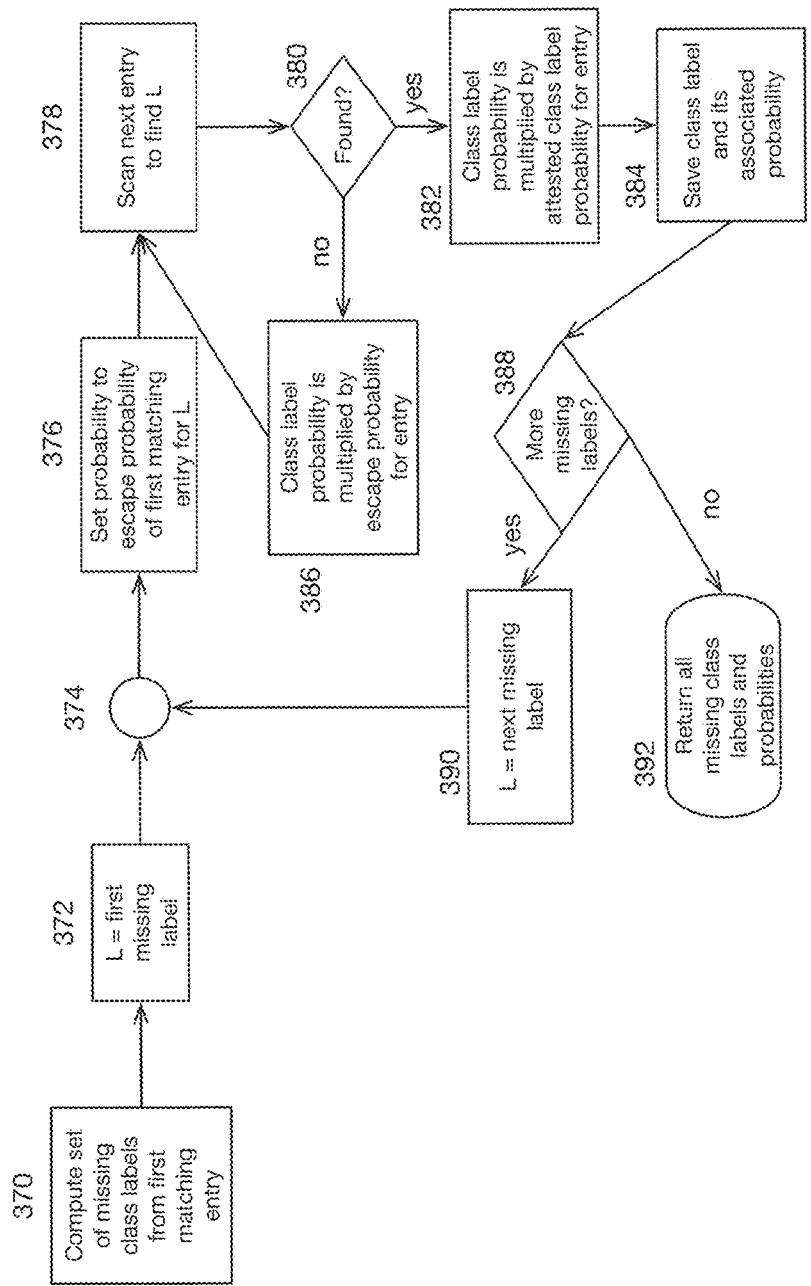

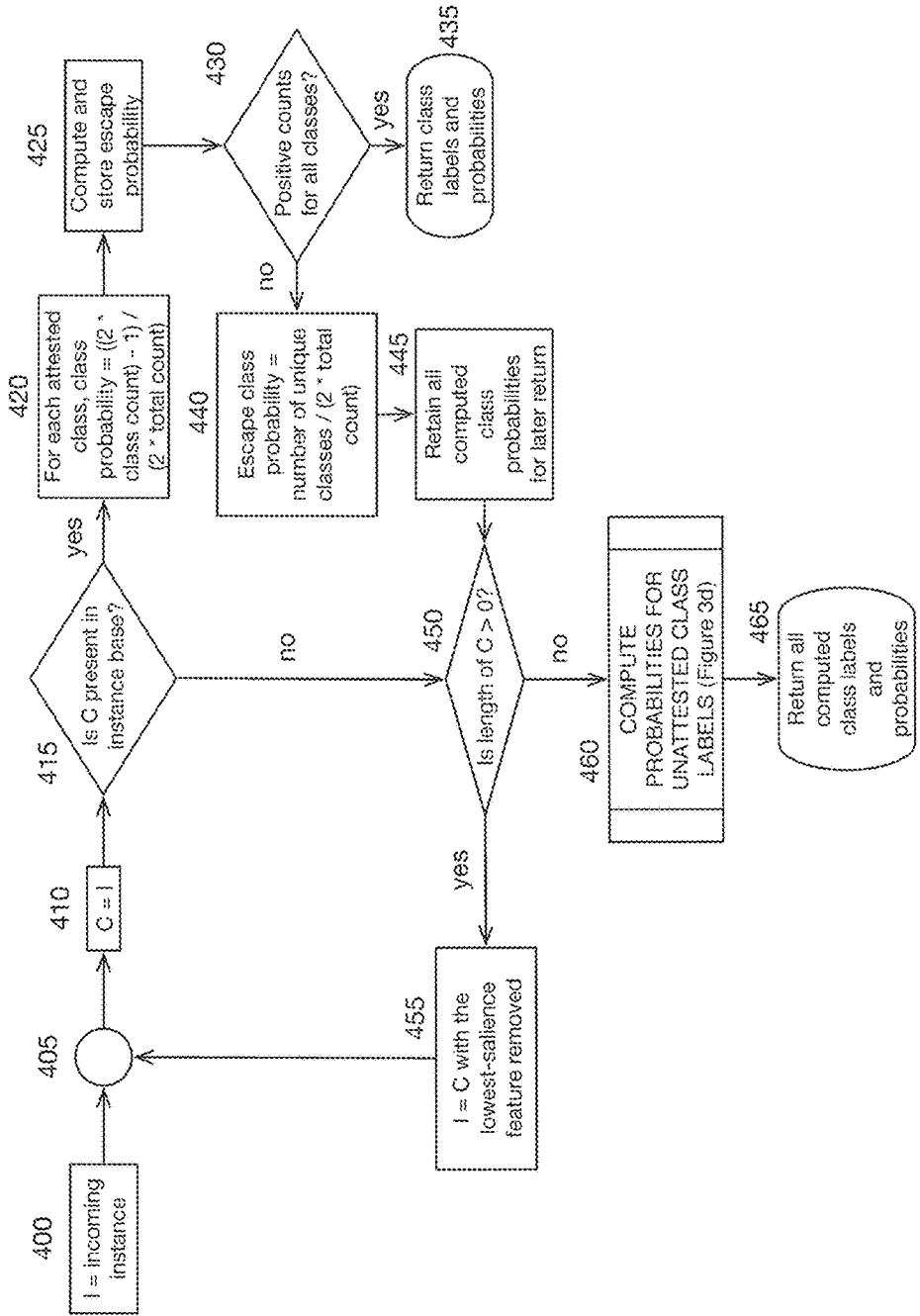

APPARATUS, SYSTEM AND METHOD FOR AN ADAPTIVE OR STATIC MACHINE-LEARNING CLASSIFIER USING PREDICTION BY PARTIAL MATCHING (PPM) LANGUAGE MODELING

CROSS-REFERENCE TO RELATED APPLICATIONS

The present application relates to and takes priority from U.S. provisional application Ser. No. 62/098,522, filed on Dec. 31, 2014 and entitled "AN APPARATUS, SYSTEM AND METHOD FOR CREATING A GENERAL-PURPOSE ADAPTIVE OR STATIC MACHINE-LEARNING CLASSIFIER USING PREDICTION BY PARTIAL MATCHING (PPM) LANGUAGE MODELING", which application is hereby incorporated by reference in its entirety.

BACKGROUND

1. The Field of the Present Invention

The present invention relates generally to an apparatus, system and method for creating a general-purpose adaptive or static machine-learning classifier using prediction by partial matching ("PPM") language modeling. This classifier can incorporate homogeneous or heterogeneous feature types; variable-size contexts; sequential or non-sequential features. Features are ordered (linearized) by information saliency; and truncation of least-informative context is used for backoff to handle previously unseen events. Labels may be endogenous (from within the group) or exogenous (outside the group) of the feature types.

2. General Background

The problem we are trying to solve is simple to state: can we exploit the known excellent modeling properties of the PPM language model approach for general-application machine learning? The PPM language models are easy to understand and implement; have a solid theoretical basis; and have proven to construct state-of-the-art models for compression applications. Over a long period the entropy measures generated using the PPM language models have been the state of the art.

Furthermore, PPM language models were from the beginning adaptive because compression required them to be that way. Adaptive models learn from what they are exposed to over time. This can be helpful when compressing heterogeneous collections of documents, and different kinds of files. Poorly compressing language models can be ignored or discarded and new models started.

It is uncommon for a state-of-the-art machine-learning classifier to have both static and adaptive implementations. A few algorithms (e.g., naive Bayes and the non-parametric lazy learners such as k nearest neighbor) have this capability (nevertheless, the adaptive variants are not frequently used; many applications cannot supply accurate truth data for updates).

Adaptation for natural language tasks is incredibly valuable. It has been observed repeatedly that models that adapt to groups or individuals outperform, sometimes very substantially, generic models. Furthermore, models that can incorporate feedback are able to improve over time. The PPM algorithm and its PPM classifier embodiment permit adaptation.

Traditional sequential techniques such as HMMs have very large numbers of parameters to estimate. In order to build models from very large amounts of data, it is usually necessary to throw away less frequent training data; and use small contents (bigrams instead of trigrams). In addition, most language modeling approaches use only homogenous features (usually words). Other techniques that allow heterogeneous feature types (e.g., maximum entropy or conditional random fields) estimate parameters using computationally expensive numerical methods. They are also not adaptive or updatable. In addition, for many machine-learning tasks they often require additional sequence computations (e.g., Viterbi algorithm) to determine optimal results. Because PPM classifiers can incorporate preceding and succeeding contexts, point-wise classifications can be generated that don't require Viterbi processing to determine optimal predictions.

The uses of the PPM compression scheme for natural language tasks by the University of Waikato research group has used almost always very different methods for dealing with classification than the PPM classifier. Document categorization, genre determination, author identification or language identification have used very simple minimal cross-entropy measures using multiple (class-specific) language models. These are more or less straight-forward applications of language modeling.

On the other hand, the approaches the research group used for such tasks as extraction of entities or word segmentation is quite different, often involving integration of multiple models and Viterbi (or Viterbi-like) computation of optimal sequences.

The PPM classifier approach proposed here use either multiple or single PPM classifiers that are trained in a manner that is not much different from other classifiers. For example, a word segmentation task would be approached by creating a data set that identifies those points in a text where segments appear. The PPM classifier would then be trained on labeled instances of homogenous sequences of characters, before and after (non-contiguous), a given focus, with only two labels (i.e., the exogenous labels split, nosplit). For any given context, the PPM classifier supplies the probabilities of split and nosplit (or in a symbolic variant, the most likely label). Note that more context can be used than in a traditional PPM model that has only left (historical) context. Furthermore, other information can be included in the PPM classifier (e.g., the lexical class of characters, such as lexical, numeric or symbol; or their phonetic properties, such as consonant vs. vowel). Some languages place limitations on syllable types (e.g., Polynesian languages always have only open syllables; syllables must end in a vowel) and this could be exploited using very small amounts of training data if these phonetic properties were provided.

U.S. Pat. No. 8,024,176 teaches a very specific sub-type of the PPM classifier. Minimal suffix prediction uses only homogenous sequential features only at the ends of words (suffixes), exogenous labels, variable-length suffix contents, symbol-only prediction and minimization. The '176 patent provides no method for incorporating prefixes or other non-sequential features such as the previous or following words into the predictor.

The Fisher text-to-phone prediction algorithm allows for preceding and succeeding contexts but uses an unmotivated backoff approach. (The author performed a few suggestive experiments that indirectly supportive of his proposed backoff procedure.) The text-to-phone algorithm uses homogeneous, but non-contiguous features (characters); exogenous labels (phones); fixed length preceding and succeeding contexts; and statistical and symbolic prediction and minimization. The Fisher algorithm is static, does not have a well justified backoff strategy (as opposed to the PPM language modeling approach). Fisher applies his algorithm only for text-to-phone mapping.

The Bilmes and Kirchhoff factored language model (FLM) is a static, non-minimized language modeling approach for predicting the most likely next word, using sequential, non-homogeneous features; with fixed length preceding contexts and a well-established Bayesian, Markov model approach (not PPM); and with endogenous labels (words). The FLM offers one or more backoff strategies. FLM implementations use either custom-designed or ad hoc backoff approaches; or use an optimization techniques (the authors offer a genetic algorithm) to construct and rank backoff strategies. The authors do not use any form of information saliency to determine optimal backoff strategies. This modeling technique is used only for language modeling (predicting the next word). The authors do not suggest the use of this algorithm for any other machine-learning problems.

The classic PPM language model is equivalent to a hidden Markov model (HMM). The most important differences between them are (a) PPM employs its own version of backoff using its "exception" mechanism to compute a mixture of ngram models to estimate probabilities; and (b) PPM is an adaptive language. In other words, the PPM classifier, for sequential machine-learning tasks for which there is no change in feature ordering introduced by information salience values, will make predictions that are nearly identical to a HMM classifier. Small differences can arise because the two types of classifiers use different backoff methods.

In summary, these earlier publications describe technologies that embody some of the set of attributes of the PPM classifier. However, in no instance did these generalize their approach to tackle other machine-learning tasks.

The PPM classifier stands alone as a general-purpose machine-learning classifier with application to a wide range of classification tasks.

What is needed is a classifier that has a solid theoretical basis, with validated excellent model-building performance, that can perform:

sequential or non-sequential features;
contiguous or non-contiguous features;
static or adaptive modeling;
homogenous or heterogeneous feature types;
endogenous or exogenous labels;
statistical or symbolic classification;
variable-size contexts;
theoretically and empirically justified backoff to make optimal predictions for unseen events;
complete or minimized models;
efficient processing and low-memory footprint for training and prediction; and
simple training and prediction implementations using widely available (hash tables, trees) programming components.

SUMMARY OF THE INVENTION

We have invented a process and method for creating a general-purpose adaptive or static machine-learning classifier using prediction by partial matching (PPM) language modeling. This classifier can incorporate homogeneous or heterogeneous feature types; variable-size contexts; sequential or non-sequential features. Features are ordered (linearized) by information saliency; and truncation of least-informative context is used for backoff to handle previously unseen events. Labels may be endogenous (from within the group) or exogenous (outside the group) of the feature types.

Classification may generate labels and their probabilities; or only labels. Classification stores may be complete or minimized where redundant states are removed producing significant space savings and performance improvements. Classifiers may be static (unchanging) or online (adaptive or updatable incrementally or in batch). PPM classifiers may be incorporated in ensembles of other PPM classifiers or different machine learning algorithms. Training and prediction algorithms are both simple and efficient; and permit multiple implementations using standard software data structures. These benefits are achieved while providing state-of-the-art prediction performance.

The PPM classifier can be used for a wide range of machine-learning tasks. The ability to include heterogeneous feature types and its straight-forward backoff techniques makes the PPM classifier a very attractive alternative to the widely used Markov model approaches. It is particularly well suited to sequence prediction, a very common problem in natural language processing:

language/character set identification;
word tokenization;
word segmentation;
end-of-sentence prediction (aka period attachment);
capitalization prediction;
accent recovery;
spelling error detection and correction;
morphological analysis and generation;
part-of-speech tag analysis and generation;
word stemming;
part-of-speech tagging;
chunking parsing;
named-entity extraction;
phrase and document categorization;
genre identification;
author identification;
semantic disambiguation; and/or
generic language modeling.

In a first aspect, the present invention includes a computer system for adaptive or static machine-learning classifier using prediction by partial matching (ppm) language modeling, the computer system having a readable and accessible storage medium, at least one processor and a user interface all interconnected, the computer system having an instance base interconnected to a PPM classifier training module including, an information salience module, subinstance generation module; statistics module; and minimization modules; and a PPM classifier date storage interconnected to the PPM classifier training module and PPM classifier prediction module including a symbolic lookup module; and a statistical lookup module.

In some embodiments the PPM classifier training module includes software having a set of instructions for generating a plurality of instances each having at least one attribute, with a feature value and a class label for each of the at least one attribute; computing information saliences for each the at least one attribute; recording the saliences for a prediction element; and ordering the instances according to the saliences.

In some embodiments the PPM classifier training module further includes a batch training submodule having software with a set of instructions for generating at least one sub-instances for each instance, counting the instances and the sub-instances; generating a set of escape class labels and respective counts; generating total count of the instances, the sub-instances and the respective counts of the set of escape labels; and generating complete symbolic classifier data.

In some embodiments the system includes removing a least salient feature from each instance.

In some embodiments the system includes determining whether an instance previously exists having a least salient feature removed therefrom.

In some embodiments the includes adding a supplemental instance having a class label with a count of 1, an escape count of 1 and a total count of 2.

In some embodiments the system includes determining whether a class label has been attested.

In some embodiments the system includes incrementing the class label and the total count for the instance with a least salient feature removed by 1.

In some embodiments the system includes adding the class label with a count of 1, incrementing the escape count by 1 and incrementing the total count by 2.

In some embodiments the system includes determining whether the length of instance having a least salient feature removed is greater than zero.

In some embodiments the system includes creating sub-instances includes creating "L" length subinstance and "L−1" length subinstances.

In some embodiments the system includes removing a least salient feature from an end of each instance.

In some embodiments the system includes determining the frequency of class labels for L length subinstances and L−1 length subinstances.

In some embodiments the system includes determining whether the most frequent class of L length subinstances is equivalent to the most frequent class of L−1 length subinstances.

In some embodiments the system includes removing the L length subinstances.

In some embodiments the PPM classifier prediction module includes software having a set of instructions for categorizing the plurality of instances according to a predetermined salience value.

In some embodiments the system includes selecting a prediction type from the group consisting of symbolic and statistical.

In some embodiments the system includes selecting a statistical prediction type from the group consisting of a first method or a second method.

In some embodiments the system includes determining whether each instance has the least salient feature removed.

In some embodiments the system includes removing a lowest salience feature from each instance.

In some embodiments the system includes determining whether each instance contains any remaining features.

In some embodiments the system includes, for each instance, attesting a class and equating a class probability with a class count divided by the total count.

In some embodiments the system includes determining an escape probability.

In some embodiments the system includes determining whether all classes have a positive count.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

FIG. 1B is a flow diagram showing PPM classifier components according to one embodiment of the present invention;

FIG. 2a shows a flow diagram of PPM classifier training components according to one embodiment of the present invention;

FIG. 2b shows a flow diagram of batch training components according to one embodiment of the invention;

FIG. 2c shows a flow diagram of incremental PPM classifier training components according to one embodiment of the present invention;

FIG. 2d shows a flow diagram of minimization of symbolic classifier components according to one embodiment of the present invention;

FIG. 3a shows a flow diagram of PPM classifier prediction components according to one embodiment of the present invention;

FIG. 3b shows a flow diagram of PPM classifier symbolic components according to one embodiment of the present invention;

FIG. 3c shows a flow diagram of statistical prediction components according to one embodiment of the present invention;

FIG. 3d shows a flow diagram of probability components according to one embodiment of the present invention; and FIG. 3e shows another flow diagram of statistical prediction components according to one embodiment of the present invention.

DETAILED DESCRIPTION OF THE PREFERRED EMBODIMENTS

Figure 1A:
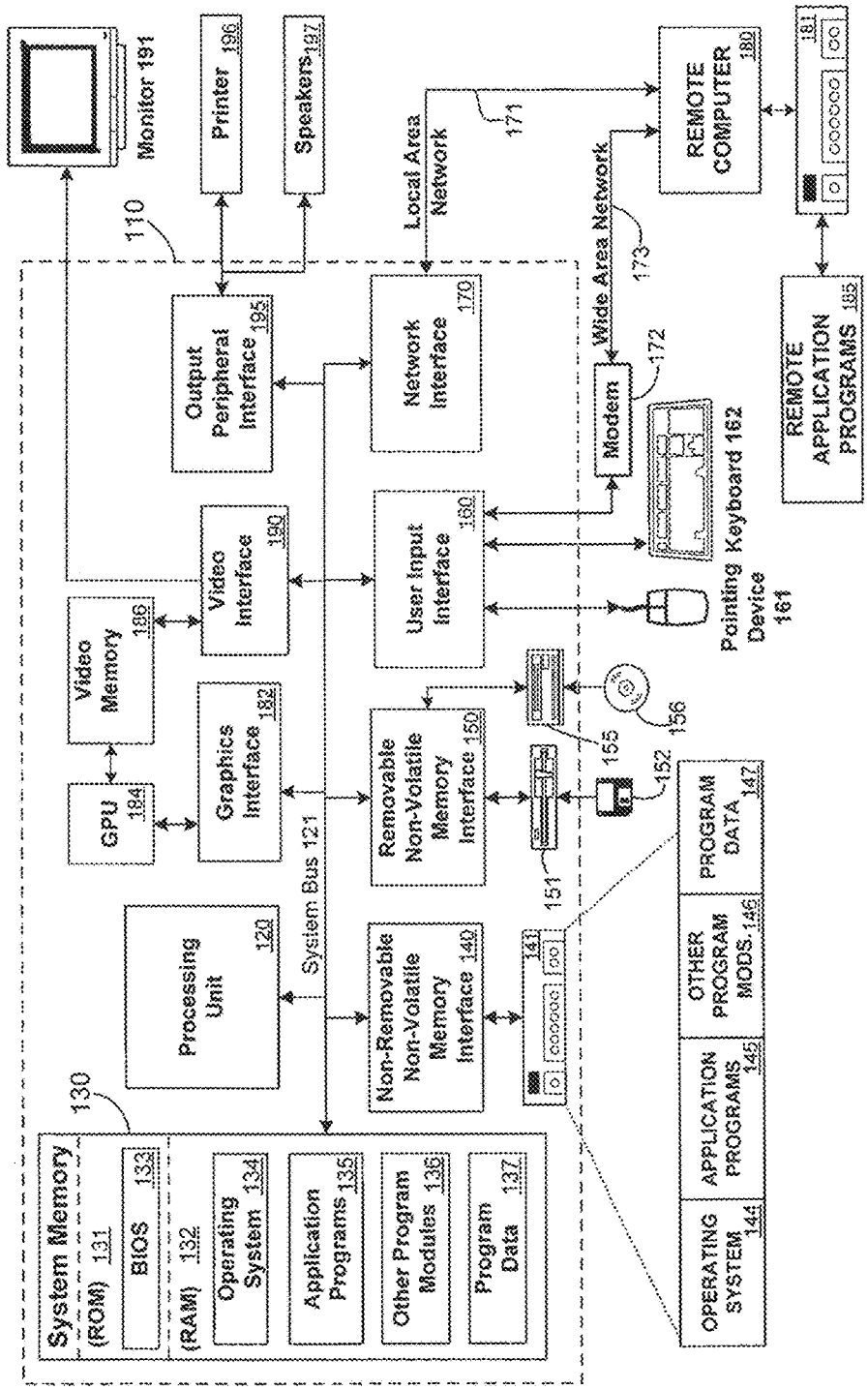
FIG. 1a is a block diagram showing an exemplary computing environment in which aspects of the present invention may be implemented.

The present disclosure will now be described more fully with reference to the figures in which an embodiment of the present disclosure is shown. The subject matter of this disclosure may, however, be embodied in many different forms and should not be construed as being limited to the embodiments set forth herein.

Exemplary Operating Environment

FIG. 1a illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1a, provide storage of computer-readable instructions, data structures, program modules, and other data for the computer 110. In FIG. 1a, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1a. The logical connections depicted in FIG. 1a include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The PPM classifier is suitable for:

sequential and non-sequential prediction tasks;

exogenous prediction using the PPM language modeling approach;

static and adaptive (online) versions; the PPM lossless compression algorithm is only adaptive;

simple algorithm compared to earlier attempts to use PPM for NLP tasks;

mapping of non-sequential features into sequential (linear) features; feature categories are evaluated for information salience (i.e., their significance in predicting labels) and reordered in ascending (or descending) saliency order;

information saliency can be computed in a variety of ways (and different approaches work better with different problems; for instance, information gain ratio does not handle large label sets as well as information gain); some possible ordering measures are: information gain, information gain ratio, Gini index, chi-squared scores; or shared variance;

like factored language models, more than one backoff approach can be used (classifier ensembles sometimes outperform a single classifier);

statistical and symbolic variants; a symbolic variant predicts only the best alternative and does not return statistics; symbolic classifiers can be minimized to a very high degree and are therefore compact and highly efficient without no loss of prediction accuracy;

homogenous and non-homogenous variants; traditional language models have homogenous features (i.e., of a uniform type such as words or characters); PPM classifiers may be non-homogenous, with many different feature types (e.g., a part-of-speech classifier could include words, possible parts of speech, suffixes, word categories, capitalization, punctuation within words, earlier part-of-speech predictions, and word classes such as Brown cluster);

contiguous and non-contiguous sequential; and non-sequential features; many phenomena cannot be modeled without incorporating both prior and succeeding contexts (e.g., end-of-sentence prediction); many machine-learning tasks are non-sequential (multiple simultaneous attributes); linearization permits them to be used in the PPM classifier;

do not require inputs to be linear; although the PPM classifier is similar to a factored language model (FLM), FLMs are always sequential;

variable-size context models; many machine-learning algorithms only work with a fixed-size instance (set of features input for training or classification); even apparently variable size instances, such as used by "bag of words" classifiers (e.g., for document classification) are really using very large feature vectors, but with a sparse representation;

very simple to implement model training and prediction algorithms using standard programming data structures such as trees, finite-state-automata and hash tables;

can both perform perfect prediction of a training set (i.e., predict without error) and predict with high accuracy for novel (previously unseen) cases; in other words, a very compact model can be used to replace very large dictionaries with no loss of accuracy;

similar to a decision tree in that it makes an ordered sequence of classification decisions; nevertheless, differs from traditional decision tree algorithms because it classifies longest to shortest context (i.e., takes a top-down "exceptions first" approach)

learns exceptions from very small training sets; for example, a PPM end-of-sentence identifier based on characters "learns" abbreviations and acronyms abbreviations that end in periods and even non-terminating abbreviations (such as "i.e." and "e.g.");

produces state-of-the-art classification statistics;

can provide point-wise predictions that may not require additional processing (such as the Viterbi algorithm) to determine the optimal label sequence;

can incorporate "backoff features" that help to generalize the training data; for instance, an end-of-sentence identifier might include not only characters, but also character types (numeric, lexical, symbolic, punctuation, whitespace and other); backoff features are most useful if only a small training corpus is available;

because the PPM classifier is adaptive or updatable, it can incorporate feedback ("truth" data) from users; or can even operate in a semi-supervised manner, for instance, incorporating automatically instances with sufficiently high confidence scores;

Overview of Dutch diminutive prediction example. This directory contains data and software for constructing a PPM Dutch diminutive classifier.

The current PPM classifier is designed similar to the classic PPM character prediction model with differences as follows:

1. like classic PPM, the inputs are fixed length (like the context "history" of size or "order" k);

2. unlike classic PPM, a class label rather than the next symbol (character) is predicted;

3. like classic PPM, sequences consist of a vector (ordered sequence) of (possibly non-homogenous) features;

4. unlike classic PPM, features can be arbitrary machine-learning features, not just sequential symbols such as characters or words;

5. unlike classic PPM, the ordering of the vector is determined by a measure of informative salience, such as the relative information gain (IG) or information gain ratio (IGR) of the feature attributes;

6. unlike classic PPM, the predicted symbol may be conditioned on both preceding and following contexts;

7. unlike classic PPM, the predicted symbol may be of a different type than the symbols in its context;

8. unlike classic PPM, the predicted class may or may not be accompanied by probabilities; and 9. like classic PPM redundant longer entries can be pruned with no loss of information; PPM minimization removes the parent of any sub-instance with identical information to the given sub instance.

It is helpful to compare the current PPM classifier to two other types of classifiers: decision tree and k nearest neighbor classifiers. The current PPM classifier bears some resemblance to decision trees (such as CART or C4.5) and the ILK IGTree. Decision trees classify using individual features, making one- or multiway decisions, often with associated probabilities, starting with the most salient. The most salient attribute or feature (i.e., with the highest informativeness, as measured, for instance, by information gain, information gain ratio, Gini index or chi-squared scores).

The PPM classifier uses informativeness to turn its data into feature vectors, ordered from most to least salient. Instances are matched from longest to shortest (or roughly equivalently, "exceptions first"), with instances having features ordered by informativeness. The PPM classifier also stores "backoff" variants of the full form. Backoff is performed by stripping features, one by one, from least to most salient. As a consequence, the current PPM classifier stores ordered instances and their truncated backoff subinstances. This is not really as much of a burden on storage as it might appear: many (sub)instances share common prefixes, so PPM instance data can be stored very compactly as trees or automata. Also, as noted above, minimized symbolic classifiers have substantially fewer instances and, consequently, don't require complex data structures for efficient and compact storage.

The current PPM classifier's main strengths include the ability to produce excellent backoff predictions for predicted labels; ability to produce purely symbolic or symbolic/statistical classifiers; minimized classifiers produce the same accuracy as complete classifiers without providing a score (frequency); minimized symbolic classifiers are extremely compact; minimized symbolic classifiers are easy to implement; for example, in hash tables or, even better, as automata (which allow all backoff values for a given instance to be computed in a single pass over the ordered instance; and, consequently, minimized symbolic classifiers are very fast.

How to Train a PPM Classifier

Training the current PPM classifier is performed in the following way:

Instance Generation: An instance base (set of instances from a sample) is generated. An instance consists of one or more features and an associated class label. Instances are a vector (ordered list) of symbols. These symbols may stand for any object or eveny (e.g., in NLP tasks it might be a character, character class, word, phrase, part-of-speech label, chunk label, syntactic constituent label, semantic category, language, genre and so forth). An instance may be homogeneous (all features of the same type) or non-homogeneous (features of different types).

For example, an instance for word tokenization may contain both characters and character classes (e.g., lexical, numeric, symbolic, punctuation, whitespace); or a part-of-speech instance may contain both part-of-speech label combinations, most probable part-of-speech label and high-frequency words as feature.

The class label may be endogenous (from the same type as the features) or exogenous (from a different type as the features). For instance, a PPM classifier to predict the most likely next character might use the preceding k characters; or a classifier to predict the most likely next word might use the preceding k words. These are both endogenous classifiers. A classifier to predict whether or not a word segmentation takes place using the surrounding characters as context is an example of an exogenous non-contiguous classifier. A classifier that predicts the language of a text fragment using the characters in the context is an example of an exogenous classifier.

Attribute Information Salience: The informativeness (e.g., IG and IGR) of all attributes is computed. This establishes the a motivated linear ordering of instance features. The classic PPM exploited attribute informativeness because characters are ordered roughly by relative information salience by default.

Feature Re-Ordering: Instances are now re-ordered by feature informativeness. Subinstances cannot be created by truncating (stripping) that least informative feature from the re-ordered instance. Since we'd like to take advantage as far as possible of common prefixes, the proper ordering of features is from most informative to least informative; and truncation is performed at the right end of the instance.

Instance Statistics Aggregation: Statistics for class labels are generated for each instance type.

Subinstance Generation: All subinstances of each base instance base are generated and added to the instance base, with statistics for class labels.

Escape Frequencies: For each instance type—which now has class label statistics associated with it—an escape class is added and given the weight of the number of label types for that instance type. The escape frequency is used for backoff to compute the frequency of labels that are not attested in the training data for the given instance type. The computation of the backoff frequencies uses PPM Model C or D, both of which use escape frequency.

Minimization: Minimization is the removal of all parent instances that have identical statistics to their child instances (i.e., their singly truncated form). Consider an instance "A B C D E" with label X of frequency 5 and Y of frequency 1; with a singly truncated form of "A B C D" with label X of frequency 5 and Y of frequency 1. The shorter instance contains exactly the same predictive information as the longer; the longer parent can be removed with no loss of information or matching power.

Depending on the implementation, minimization may not be appropriate. If the classifier is implemented as a hash map, it is probably appropriate to minimize since we'd like to reduce the number of instances to store to a minimum. If the implementation is an automaton or tree, this is far less important since the automaton or tree already stores intermediate sub-instances anyway. They only need to store the values for the redundant nodes. Note, however, that (sub)instances that are redundant for a symbolic classifier are not necessarily redundant for a statistical classifier (their statistics may be different). Furthermore, a statistical classifier needs to compute the values for classes whenever a truncation is taken in order to compute backoff statistics. Consequently it is necessary to retain (or restore) all intermediate subinstances. This does not cost much when storing the instances as an automaton or tree since these features would be included anyway; the only difference is that they would now have their associated statistics stored as well in all possible (sub)instances. These statistics are possible to restore from a minimized automaton or tree simply: any missing (sub)instances *must* have the same statistics as the first matching subinstance (up to and including the null-context frequencies of the labels).

Symbolic Classifier: Once minimization has been performed, it is now possible to further reduce the instance data: retain only the most frequent label(s) for an instance. All other labels, including the escape label, can be removed.

How to Implement a Symbolic PPM Classifier

Once minimization and symbolic classifier instances have been constructed, the remaining instances and their associated labels need to be stored compactly and efficiently.

Three straight-forward implementation approaches are:

Hash map: Create a hash map using instances as keys and class labels as values. An instance to be classified will probe the hash map as many as k times (where k is the length of the instance). The values for the longest successful match are returned.

Automaton: Create an automaton with features as states and class labels as outputs for matching sequences. An instance to be classified will be submitted once to the automaton since all matching sub-sequences will be found when matching the full instance. The longest values for the longest successful match are returned.

Tree: Create a tree (or trie) from the instances with features as nodes. An instance to be classified will be submitted only once to the tree since all matching sub-sequences will be found when attempting to matching the full instance. The values for the longest successful match are returned.

How to Predict with a Symbolic PPM Classifier

Predicting is uncomplicated. An instance is generated according to the same protocol used to generate training instances. The instance is submitted to the PPM classifier by looking up the instance in one of the three data structures indicated above. The values associated with the longest matching subsequence (formed by right truncation) are returned.

How to Implement a Statistical PPM Classifier

The exact same approaches as with the symbolic classifier can be used for a statistical classifier. Statistical classifiers provide only one important feature that symbolic classifiers don't: the ability to compute the probabilities for all the class labels conditioned by the given context. If only a point-wise classification is needed, there may be no reason to use a statistical classifier. However, if the classifier is aggregating statistics from each classification (e.g., to identify the language or genre of a given text), then statistics will be needed for all labels.

How to Predict with a Statistical PPM Classifier

A statistical PPM classifier potentially needs *all* sub-sequences (down to order 0, the empty sub-instance). First, it's necessary to find the longest match among the (sub) instances. That will have at least one label (of the m labels that are to be predicted). If statistics for all m labels are included with the longest match, all the relevant data is found with that instance. If some labels are not found, then the escape computation needs to be performed.

Computing label probabilities uses PPM Methods C or D for computation of escape values. Consider a statistical PPM classifier for language identification of English and French. If an instance (or sub-instance) has both class labels (with associated frequencies), there's no problem computing their probabilities immediately. However, if an instance has only one class label (and not both), it's necessary to compute the probability for the unseen (unattested) label for that instance. This is done by using the standard escape computation for each missing label (in this case, only one label). This missing label *must* be found ultimately using this procedure since *all* labels will be found in the small context (order 0) in a PPM model.

Not Necessary to Use Full Exclusion in PPM Classifiers.

Note that for PPM classification, it is not necessary to perform classic PPM "full exclusion".

Full exclusion deducts the counts of classes that were predicted by the parent order from those of the child order. In other words, when an order n model escapes to an order n−1 model, the order n−1 model removes classes appearing in the order n model. Removing these classes causes no difficulties because they have already been considered in the order n model.

Full exclusion produces probabilities that are beneficial to compression: because it assigns higher probabilities, fewer bits are encoded. However, not using full exclusion does not change the *relative* proportion of classes. In a PPM classifier what matters are the relative not the absolute entropy values.

Avoiding full exclusion also speeds up the calculation of escapes for probabilistic PPM classifiers especially when there many classes.

Adaptive (on-line) PPM Classifier

The classic PPM compression algorithm is adaptive, that is, its statistics are updated as news symbols are entered for compression. The statistical PPM classifier can similarly be implemented as an on-line classifier using essentially the same update approach as the PPM compression algorithm. This is simple if data is maintained in its original, non-minimized form since it merely involves modifying matching (sub)instances in the PPM model. Only two operations are necessary: if the label is already assigned to the instance, incrementing its frequency count; and if the label is not already assigned in the instance, adding a new label to the instance with a count of one. Changes should also be propagated the total count and escape (it has a value equal to the number of types in the given (sub)instance.

Simple Word Segmentation Problem Using PPM Models C and D, with and without Full Exclusion A Theoretical Aside The prediction-by-partial matching (PPM) algorithm is a method for constructing a Markov model with estimation of output frequencies using a mixture of counts of multiple subsequences, including lower-order "backoff" subsequences.

PPM according to the present invention is an adaptive algorithm; its data changes at it processes more data. It inspects/records an input sequence (a "context") and a target; and inspects/records (truncated) subsequences of this context. PPM predicts the next character in a character sequence; and uses left-truncation to generate subsequences only if the full sequence is not found. This truncation process is the essence of "backoff". The backoff process was designed to deal with contexts that had not been seen before, so something must be done to estimate them on the basis of available evidence. The notion is that shorter and shorter contexts will become more and more likely to match the input context; and if nothing matches, there remains a zero-order context (that's just the character to be predicted without any context); and the so-called "−1" order in those when even the character to be predicted has not yet been seen until now. PPM now has statistics all the way down this chain from the longest to the shortest order contexts, until a match is made (or the process reaches the end of the read at the −1 order). The PPM probability for the given character output is then the product of a series of probabilities taken from all the unmatched contexts down to the one that finally does (and the −1 order *always* matches). PPM uses several techniques for estimating these previously unseen ("zero-frequency") events (such as Method C and D) which are used to assign a certain proportion of the observed frequency mass to unseen events; and "exclusion" which ensures that the counts of a longer sequence (context) are not double-counted in a containing subsequence (subcontext). These two techniques provide better estimates of frequency counts for unattested (sub)sequences and for symbols (i.e., with zero [or minimal] frequency) in a context.

In addition, the system considers the concrete implementation of the classic PPM compression language model to see what it is doing and how it can be generalized:

the input sequence is an ordered sequence ("history") of symbols occurring just before the output character a symbol (in machine-learning jargon, a "feature") may stand for any type of event (character, word, part-of-speech label, . . . )

each input sequence consists of a "context" and a "target"

the symbols of a "context" may be uniform ("homogeneous") or non-uniform ("non-homogeneous"); in other words, there can be multiple types of symbols in a context the order of symbols in a context is significant (i.e., it is not a bag or set of features)

the context and target symbols may be of different types ("exogenous") or of the same type ("endogenous"); for instance, a word segmentation PPM may have characters for context and a label indicating one of two choices (split/nosplit) as its target subsequences of the input sequence are generated by a backoff protocol that should strive to remove symbols from least to most important to decision making (e.g., by their information gain or information gain ratio scores);

re-ordering symbols—in an arbitrary original order—by one or more informativeness scores allows any combination of symbols to be transformed into a sequence to which back can be performed by truncation It should now be clear, that this abstraction of the PPM language modeling approach can now be applied to a wide range of classification tasks.

Previous attempts by the University of Waikato PPM team to construct classifiers using the original PPM algorithm have turned out to be quite complex. Multiples classification problems, for example, have required building PPM language models for (at least) each class. (This is done by other models, for example, SVMs are innately binary classifiers and perform multiples classification by building a one vs. all classification model for each class in the task.) And there are clearly some types of problems, such as document categorization, genre identification, language identification, and author detection for which a minimal cross-entropy approach works quite well. For these tasks, a PPM language model is constructed for each class; cross-entropy is computed against each model; and the class for the model which results in the lowest cross-entropy score is taken as the prediction.

However, for sequence classification these attempts have turned out to be clumsy and difficult to implement. By contrast, using the generalization presented above allows a traditional PPM to be converted into a classifier by using class labels for targets; and by using variable-length, ordered feature vectors as contexts. The generalization also permits adding following (right) contexts (not just prior (left) contexts); and even previous outputs (e.g., previous predictions) in the context.

Since symbols do not need to be of the same type as the context features, it is possible to modify the input sequence to make it more informative, especially when the amount of training data is small. For example, for tokenization:

"I was born on Jan. 2, 1951."

could be re-represented by substituting "L" for any uppercase character; "l" for any lowercase character; and "d" for any digit:

"|L| |lll| |lllll| |ll| |Lll|. |d|, |dddd|."

where "|" means a word boundary.

or, at the atom level, by a sequence of symbols "|single-uppercase-lexical-character|WS1|small-lexeme|WS1|small-lexeme|WS1 small-lexeme|WS1| pos-sible-abbreviation NO_WS period|WS1|single-digit-|NO_WS comma WS1|four-digits|NO_WS|period"

Rewriting the sequence in this way involves a small amount of lexical engineering; however, it permits the algorithm to discover latent tokenization rules such as: "A comma is separated from a preceding token if it is preceded by a one-digit atom and followed by a single whitespace that is followed by a four-digit atom Similarly, the input sequence for a part-of-speech disambiguation utility ("tagger") could use tag-combinations or most probably tags plus high-frequency terms as symbols.

Generating Sub-sequences and the Back-off Protocol

The following word segmentation training example can be computed using PPMD data for it:

'abrac|adab|ra' where '|' indicates a segmentation.

Applying the model this using prefix and suffix lengths of 2.

To produce a PPM model, the training corpus can be processed character-by-character to generate instances. In this example, instances will have the initial form:

LL|RR and inferred (back-off) forms are generated here with the following back-off protocol:

LL|RR
L|RR
L|R
|R
|

In other words, truncate on right, then on left until only the focus remains. In this example, two trailing and two leading "dummy" characters are affixed to the example to allow for full-form training instances at all positions. Another approach would be to allow truncated instances in these cases. Unfortunately, the proposed back-off protocol does not work for these instances.

The training instances and their back-off forms generated are, in order:

| | | |
|---|---|---|
| ##\|ab | F | 1 |
| #\|ab | F | 1 |
| #\|a | F | 1 |
| \|q | F | 1 |
| \| | F | 1 |
| #a\|br | F | 1 |
| a\|br | F | 1 |
| a\|b | F | 1 |
| \|b | F | 1 |
| \| | F | 1 |
| ab\|ra | F | 1 |
| b\|ra | F | 1 |
| b\|r | F | 1 |
| \|r | F | 1 |
| \| | F | 1 |
| br\|ac | F | 1 |
| r\|ac | F | 1 |
| r\|a | F | 1 |
| \|a | F | 1 |
| \| | F | 1 |
| ra\|ca | F | 1 |
| a\|ca | F | 1 |
| a\|c | F | 1 |
| \|c | F | 1 |
| \| | F | 1 |
| ac\|ad | T | 1 |
| c\|ad | T | 1 |
| c\|a | T | 1 |
| \|a | T | 1 |
| \| | T | 1 |
| ca\|da | F | 1 |
| a\|da | F | 1 |

-continued

| | | |
|---|---|---|
| a\|d | F | 1 |
| \|d | F | 1 |
| \| | F | 1 |
| ad\|ab | F | 1 |
| d\|ab | F | 1 |
| d\|a | F | 1 |
| \|a | F | 1 |
| \| | F | 1 |
| da\|br | F | 1 |
| a\|br | F | 1 |
| a\|b | F | 1 |
| \|b | F | 1 |
| \| | F | 1 |
| ab\|ra | T | 1 |
| b\|ra | T | 1 |
| b\|r | T | 1 |
| \|r | T | 1 |
| \| | T | 1 |
| br\|a# | F | 1 |
| r\|a# | F | 1 |
| r\|a | F | 1 |
| \|a | F | 1 |
| \| | F | 1 |
| ra\|## | F | 1 |
| a\|## | F | 1 |
| a\|# | F | 1 |
| \|# | F | 1 |
| \| | F | 1 |

Using Feature Re-ordering to Re-introduce Truncation

However, note that re-ordering the sequence in advance makes it possible to generate subsequences very easily by truncation.

Re-ordering should, in fact, not be done randomly or arbitrarily; it should be done so that the truncations are done from least to most informative symbols. This is straightforward to compute using a scoring method such as information gain or information gain ratio (preferred since it doesn't overweight low-frequency events). Information gain ratio (IGR) is information gain (IG) divided by split information (SI):

$$w\text{-}sub\text{-}i = H(C) - \frac{SUM\ v\text{-}elem\text{-}of\text{-}V\text{-}sub\text{-}i\ P(v) * H(C|v)}{SI(i)}$$

where:
H(C) is the total entropy
and
SI(i)=SUM v=elem-of-V-sub-i P(v)*log2(P(v))

PPM was designed to work with strings using truncation to create subsequences. This is precisely what one would expect for strings in natural language: the information gain (or information gain ratio) decreases monotonically the further one moves to the left from the target.

Information gain ratio is the algorithm used by the IGTree variant of TiMBL.

Feature re-ordering by IGR also permits construction of non-uniform (heterogeneous) features (e.g., characters+character classes; part-of-speech labels+words). IGR is only a problem if the many features with close IGR values so that a small change in IGR values could substantially re-order the features.

The example back-off protocol can be performed using truncation, if the features are ordered as follows:
L1 L2 focus R1 R2 ->L1 R2 L2 R1 focus
Truncation can now be used with the re-ordered sequence to generate sub-sequences equivalent to those given above.
Returning no to the example:
'##abrac\|adab\|ra##'
The PPM statistics tables are constructed, without exclusions, and exceptions are computed (zero-frequency cases) using PPM's "Method C":

| Order 2L2 Predictions c p | Order 1L2R Predictions c p | Order 1L1R Predictions c p | Order 0L1R Predictions c p | Order 0L0R Predictions c p |
|---|---|---|---|---|
| ##\|ab → F 1½ → ESC 1½ | #\|ab → F 1½ → ESC 1½ | #\|a →F 1½ → ESC 1½ | \|a → T 1/7 → F 4/7 → ESC 2/7 | → T 2²/14 → F 10¹⁰/14 → ESC 2¹/14 |
| #a\|br → F 1½ → ESC 1½ | a\|br → F 1½ → ESC 1½ | a\|b → F 2/3 → ESC 1/3 | \|b → F 2/3 → ESC 1/3 | [already in table] |
| ab\|ra → T 1¼ → F 1¼ → ESC 2½ | b\|ra → T 1¼ → F 1¼ → ESC 2½ | b\|r → T 1¼ → F 1¼ → ESC 2½ | \|r → T 1¼ → F 1¼ → ESC 2½ | [already in table] |
| br\|ac → F 1½ → ESC 1½ | r\|ac → F 1½ → ESC 1½ | r\|a → F 2/3 → ESC 1/3 | [already in table] | [already in table] |
| ra\|ca → F 1½ → ESC 1½ | a\|ca → F 1½ → ESC 1½ | a\|c → F 1½ → ESC 1½ | \|c → F 1½ → ESC 1½ | [already in table] |
| ac\|ad → T 1½ → ESC 1½ | c\|ad → T 1½ → ESC 1½ | c\|a → T 1½ → ESC 1½ | [already in table] | [already in table] |
| ca\|da → F 1½ → ESC 1½ | a\|da → F 1½ → ESC 1½ | a\|d → F 1½ → ESC 1½ | \|d → F 1½ → ESC 1½ | [already in table] |
| ad\|ab → F 1½ → ESC 1½ | d\|ab → F 1½ → ESC 1½ | d\|a → F 1½ → ESC 1½ | [already in table] | [already in table] |
| da\|br → F 1½ → ESC 1½ | a\|br → F 1½ → ESC 1½ | a\|b → F 1½ → ESC 1½ | [already in table] | [already in table] |
| br\|a# → F 1½ → ESC 1½ | r\|a# → F 1½ → ESC 1½ | [already in table] | [already in table] | [already in table] |
| ra\|## → F 1½ → ESC 1½ | a\|## → F 1½ → ESC 1½ | a\|# → F 1½ → ESC 1½ | \|# → F 1½ → ESC 1½ | [already in table] |

If a sequence such "ac\|##" is entered, its processing sequence (including back-off) is as follows:
try "ac\|##": not found
try "c\|##": not found
try "c\|#": not found
try "\|π": found with FALSE, but no TRUE; escape=1/2
try "\|": foundwith TRUE with weight 2/14; subtract 1 to compute discounted exclusion: 2/13
prob(F)=1/2 prob(T)=1/2*2/14=1/4 (no exclusion); 1/2*2/13=1/13 (exclusion)

The prediction: This is NOT a segmentation point with a probability of 0.50; and the probability of being a segmentation point is 0.14.

The symbolic PPM algorithm produces the same result, but without computing probabilities. Note that the sequence "ab|ra" is ambiguous under a order k=2 PPM model. However, it could be disambiguated by extending the sequence one more character to the left or right (i.e., by making the order of the model larger). These cases also cause problems for the symbolic algorithm because it must chose between the two in a variety of ways: randomly (this would select TRUE and FALSE with equal frequency); using the maximum unigram frequency (this would always select FALSE).

'##abrac|adab|ra##'

It is now widely understood (based on many experiments) that, for text compression, "Method D" works well with exclusion for fixed-length models (of which this is an example).

Here is the same table computing exceptions (zero-frequency cases) using "Method D":

| Order 2L2 Predictions c p | Order 1L2R Predictions c p | Order 1L1R Predictions c p | Order 0L1R Predictions c p | Order 0L0R Predictions c p |
|---|---|---|---|---|
| ##\|ab → F 1½ | #\|ab → F 1½ | #\|a →F 1½ | \|a → T 1¹/₁₀ | → T 2³/₂₄ |
| → ESC 1½ | –> ESC 1½ | → ESC 1½ | → F 4⁷/₁₀ | → F 10¹⁹/₂₄ |
|  |  |  | → ESC 2¹/₁₀ | → ESC 2²/₂₄ |
| #a\|br → F 1½ | a\|br → F 1½ | a\|b → F 2¾ | \|b → F 2¾ | [already in |
| → ESC 1½ | → ESC 1½ | → ESC 1¼ | → ESC 1¼ | table] |
| ab\|ra → T 1¼ | b\|ra → T 1¼ | b\|r → T 1¼ | \|r → T 1¼ | [already in |
| → F 1¼ | → F 1¼ | → F 1¼ | → F 1¼ | table] |
| → ESC 2½ | → ESC 2½ | → ESC 2½ | → ESC 2½ |  |
| br\|ac → F 1½ | r\|ac → F 1½ | r\|a → F2¾ | [already in | [already in |
| → ESC 1½ | → ESC 1½ | → ESC 1¼ | table] | table] |
| ra\|ca → F 1½ | a\|ca → F 1½ | a\|c → F 1½ | \|c → F 1½ | [already in |
| → ESC 1½ | → ESC 1½ | → ESC 1½ | → ESC 1½ | table] |
| ac\|ad → T 1½ | c\|ad → T 1½ | c\|a → T 1½ | [already in | [already in |
| → ESC 1½ | → ESC 1½ | → ESC 1½ | table] | table] |
| ca\|da → F 1½ | a\|da → F 1½ | a\|d → F 1½ | \|d → F 1½ | [already in |
| → ESC 1½ | → ESC 1½ | → ESC 1½ | → ESC 1½ | table] |
| ad\|ab → F 1½ | d\|ab → F 1½ | d\|a → F 1½ | [already in | [already in |
| → ESC 1½ | → ESC 1½ | → ESC 1½ | table] | table] |
| da\|br → F 1½ | a\|br → F 1½ | a\|b → F 1½ | [already in | [already in |
| → ESC 1½ | → ESC 1½ | → ESC 1½ | table] | table] |
| br\|a# → F 1½ | r\|a# → F 1½ | [already in | [already in | [already in |
| → ESC 1½ | → ESC 1½ | table] | table] | table] |
| ra\|## → F 1½ | a\|## → F 1½ | a\|# → F 1½ | \|# → F 1½ | [already in |
| → ESC 1½ | → ESC 1½ | → ESC 1½ | → ESC 1½ | table] |

Note that most entries in the table are unchanged from the "Method C" table.

If a sequence such "ac|##" is entered, its processing sequence (including back-off) is as follows:

try "ac|##": not found
try "c|##": not found
try "c|#": not found
try "|#": found with FALSE, but no TRUE; escape=1/2
try "|": foundwith TRUE with weight 2/14; subtract 1 to compute discounted exclusion: 2/13
prob(F)=1/2
prob(T)=1/2*3/24=3/48 (no exclusion); 1/2*3/22=3/44 (exclusion)

The prediction: This is NOT a segmentation point with a probability of 0.50. The probability of being a segmentation point is 0.07.

Minimized (Pruned) Models

| Order 2L2 Predictions c p | Order 1L2R Predictions c p | Order 1L1R Predictions c p | Order 0L1R Predictions c p | Order 0L0R Predictions c p |
|---|---|---|---|---|
| ##\|ab → F 1½ | #\|ab → F 1½ | #\|a →F 1½ | \|a → T 1¹/₁₀ | → T 2³/₂₄ |
| → ESC 1½ | → ESC 1½ | → ESC 1½ | → F 4⁷/₁₀ | → F 10¹⁹/₂₄ |
|  |  |  | → ESC 2¹/₁₀ | → ESC 2²/₂₄ |
| #a\|br → F 1½ | a\|br → F 1½ | a\|b → F 2¾ | \|b → F 2¾ | [already in |
| → ESC 1½ | → ESC 1½ | → ESC 1¼ | → ESC 1¼ | table] |
| ab\|ra → T 1¼ | b\|ra → T 1¼ | b\|r → T 1¼ | \|r → T 1¼ | [already in |
| → F 1¼ | → F 1¼ | → F 1¼ | → F 1¼ | table] |
| → ESC 2½ | → ESC 2½ | → ESC 2½ | → ESC 2½ |  |
| br\|ac → F 1½ | r\|ac → F 1½ | r\|a → F2¾ | [already in | [already in |
| → ESC 1½ | → ESC 1½ | → ESC 1¼ | table] | table] |
| ra\|ca → F 1½ | a\|ca → F 1½ | a\|c → F 1½ | \|c → F 1½ | [already in |

| Order 2L2 Predictions c p | Order 1L2R Predictions c p | Order 1L1R Predictions c p | Order 0L1R Predictions c p | Order 0L0R Predictions c p |
|---|---|---|---|---|
| → ESC 1½ | → ESC 1½ | → ESC 1½ | → ESC 1½ | table] |
| ac\|ad → T 1½ | c\|ad → T 1½ | c\|a → T 1½ | [already in | [already in |
| → ESC 1½ | → ESC 1½ | → ESC 1½ | table] | table] |
| ca\|da → F 1½ | a\|da → F 1½ | a\|d → F 1½ | \|d → F 1½ | [already in |
| → ESC 1½ | → ESC 1½ | → ESC 1½ | → ESC 1½ | table] |
| ad\|ab → F 1½ | d\|ab → F 1½ | d\|a → F 1½ | [already in | [already in |
| → ESC 1½ | → ESC 1½ | → ESC 1½ | table] | table] |
| da\|br → F 1½ | a\|br → F 1½ | a\|b → F 1½ | [already in | [already in |
| → ESC 1½ | → ESC 1½ | → ESC 1½ | table] | table] |
| br\|a# → F 1½ | r\|a# → F 1½ | [already in | [already in | [already in |
| → ESC 1½ | → ESC 1½ | table] | table] | table] |
| ra\|## → F 1½ | a\|## → F 1½ | a\|# → F 1½ | \|# → F 1½ | [already in |
| → ESC 1½ | → ESC 1½ | → ESC 1½ | → ESC 1½ | table] |

There are 39 (sub)context ngrams in this model. Minimizing this model for (sub)strings with identical statistics removes 27 ngrams, leaving 12 ngrams in the table (marked in yellow and blue). Pruning this model with identical label predictions only removes and additional 9 ngrams (total 36), leaving only 3 ngrams in the table (marked in blue).

For many natural language processing tasks, symbolic PPM classifiers often can be prune radically, resulting in an extraordinarily small final model.

FIG. 1*b*: PPM Classifier Components

Supervised machine-learning classifiers consist of two components: a "training" component 3 that constructs a model from a set of instances (a set of concrete values for attributes) with associated labels; and a "prediction" component 8 that uses the model generated in training to predict the class label(s) for a submitted instance.

PPM classifiers have two types: statistical and symbolic; and two varieties: full and minimized. The PPM classifier training module always generates and maintains a full statistical model. All other models (minimized statistical, full symbolic, minimized symbolic) are derived from the full statistical model. (As a rule, however, only two types of PPM classifier models are constructed for real-world applications: full statistical and minimized symbolic.)

Only the full statistical model can be modified or updated incrementally, because the computation of the various derived models involves removing information from the full statistical model. Consequently, the full statistical model must be maintained if updates or modifications to any derived models are required.

As shown in FIG. 1*b*, the "instance base" 1 is the source of training instances. The final classifier model generated by the PPM classifier training module 3, as well as other statistical or processing-related data used to generate this model, are stored in the PPM classifier data store 2. The PPM classifier training module 3 is a software component that performs a set of operations specific to constructing the PPM classifier models. First, the PPM classifier training module 3 inspects the instance base to determine, for the given set of instances, the information salience of each attribute (the category of a feature set). Information salience is the degree to which each attribute contributes to classification. The information salience module 4 computes these statistics and produces an ordered ranking of attributes using the data from the training instances. Information salience of attributes is dependent on the training instances so the training instances should be sufficiently large and also representative of the instances that will be submitted for prediction.

Next the subinstance generation module 5 generates instances and their subinstances (truncated versions of instances) by first creating from the original instance a reordered form based on information salience; and then creating subinstances by removing, one by one, attributes, from least to most salient. The frequencies of instances and subinstances by category are computed in the statistics module 6. The statistics module 6 is also responsible for computing the default (unconditional or "zero-order") class frequencies; and the escape counts for each training instance and subinstance. The minimization module 7 identifies predictively redundant instances and subinstances and removes them to construct a minimized model. The minimization module 7 also converts statistical models into symbolic modules. Symbolic modules record only the most probable label for a given instance or subinstance, discarding the statistics for all other class labels associated with instances and subinstances; and then remove redundant instances and subinstances. Minimized symbolic models output exactly the same prediction as statistical models using only a fraction of the instances and subinstances in a full statistical model. The PPM classifier prediction module 8 handles the prediction process for the two types of PPM classifiers. The symbolic lookup module 9 produces the most probable class label of the longest matching pattern in a symbolic PPM classifier model. The statistical lookup model 10 produces the probabilities for all class labels for the longest matching pattern in a statistical PPM classifier model.

FIG. 2*a*:

PPM classifier training, instance computation Classifier training and instance computation take place as follows. First, instances are generated 11. An instance consists of an ordered list of feature values for each attribute and an associated class label. Next information salience statistics are computed for all attributes of all training instances 20. These salience statistics are then recorded 25. The salience statistics are then used to reorder instance attributes in descending salience order 30. These reordered instances can then be submitted for batch training 40 or incremental training 125.

FIG. 2*b*:

Batch training is training from a collection of instances. The first step in batch training is to generate subinstances 50. A subinstance is a truncated form of the original instance. Instances are truncated in reverse information salience order, from the least to most salient attribute. Since instances have been reordered by information salience, this can be performed by merely removing, one after another, the features from right to left. The counts of instances and subinstances are recorded 60. After counting is complete for all instances and subinstances, it is possible to determine escape class labels and counts 70. The computation of escape class labels and counts is based on both the number of unique labels, and total count of all class labels for a given training instance or subinstance 75. Consequently, it is not possible to compute escape values until all instances and subinstances have been recorded. After all these counts have been made, it is possible to construct a symbolic form of the full statistical classifier data 77. Next this symbolic classifier data can be minimized 80 by removing all those instances and subinstances that are redundant from a classification point of view. An instance or subinstance that has exactly the same class prediction of its immediately shorter subinstance can be removed, since the longer sequence has no additional predictive value. Finally, all instances are recorded 99 in a database or data store convenient for PPM classifier prediction.

FIG. 2c: Incremental PPM Classifier Training

Incremental classifier training generates a classifier not by computing over a set of instances, as in batch training, but rather instance by instance. Incremental PPM classifier training proceeds as follows. An instance is submitted for classifier training and stored along with its class label 1300. The original instance 1320 is then submitted to a process 1340 that generates, one by one, instances and their subinstances based on the information salience of attributes. First, the current instance or subinstance is examined; this is designated C 1360. If C is already present in the instance base 1380, the class label for C is checked 1400. If the label is present, the class label and total counts for this label are incremented 1420; if not, the label is added with an initial count of 1, the escape count is incremented and the total count is incremented by 2 1410. If C was not in the instance base, the instance and its class label are added to the instance base; and the class label is given a count of 1, an escape count of 1 and a total count of 2 1430. Next, C is examined to count its features 1440. If any remain, then the next subinstance is computed by removing the least salient feature of C 1460; and this is submitted to the next iteration of the process 1340. Note that the empty sequence of features is a relevant prediction environment always examined in the final iteration of the process 1340: it is the likelihood of class labels irrespective of any context. This is the terminal (fallback) probability distribution for class labels if no context matches.

2d: Minimization of Symbolic Classifier

It is possible to minimize both statistical and symbolic classifiers. However, because some data structures such as trees and automata compress common prefix patterns, there is often a low cost to including redundant prefix patterns. Also, minimization of a statistical PPM classifier requires that all the relevant properties of a parent be identical (or nearly identical) to that of a child for the parent to be removed. This occurs less frequently for statistical PPM classifiers than for symbolic PPM classifiers; hence, minimization in general removes more data from symbolic than from statistical models.

The minimization of symbolic classifiers proceeds as follows. Each instance in the set of instances 1500 is examined in an iterative process 1520. First determine the number of features in the instance 1540. Then, a nested iterative process 1560 proceeds as follows: two subinstances of the original instance I are computed 1580: one consisting of the L most-salient features, and the other of the L−1 most salient features. The most frequent class labels of the two subinstances are compared 1600. If the most frequent class label of the longer subinstance is identical to that of the shorter, then the longer form is removed from the instance base 1620. Whether or not the most frequent class labels are the same, the length L is then decremented by one 1640 and a subsequent iteration of the process 1560 is performed with the new value of L. This proceeds with the current instance I until the shortest possible (zero) subsequence has been compared 1660. While there are more instances to examine 1680, each is submitted 1700 to the outer iterative process 1520. The process is finished when the every instance has been inspected 1720.

FIG. 3a: PPM Classifier Predictions

The prediction process mirrors the classifier training process. First an instance is generated using exactly the same features as the training instances 210. The instance is then reordered based on attribute salience values 220. One of two possible prediction types are possible 230: statistical 250 and symbolic 240. Statistical prediction has two varieties: "Method C" 260 and "Method D" 270.

FIG. 3b: PPM Symbolic Prediction

In PPM symbolic prediction, the class label of the longest matching instance or subinstance is the prediction (including the zero-length subinstance). An incoming instance 255 and its possible subinstances (if necessary) are looked up in order in an iterative process 260. First the original instance or subinstance is checked 270. If it is found in the instance base, its class label is returned and the prediction process is done 275. If not, the next subinstance to evaluate is created by removing the least salient feature 280, and this is submitted for lookup 260. This proceeds until either a match is found 275, or there are no longer any features remaining, in which case the global default (unconditional or "zero-order") prediction is returned 290.

FIG. 3c: Statistical Prediction (Method C)

The statistical prediction approaches (both Method C, described in FIG. 3c, and Method D, described in FIG. 3e) are very similar. An instance and its possible subinstances are looked up. The predictions for the longest matching instance or subinstance are the values for the attested labels (the non-escape labels, labels with counts of one or more). But the predictions for the remaining labels must be computed by inspecting the statistics for shorter and shorter sequences until label matches are found. This process always terminates successfully because the zero-length subinstance has all possible attested labels with frequency counts of one or more. The process for performing statistical prediction (Method C) is as follows. The incoming instance 300 and its subinstances are inspected in order, with truncation performed as usual by removing the least salient attribute from the instance 355. The instance and its subinstances are submitted in turn to an iterative process 310 and 315. First, the instance is checked to see if it is in the instance base 315. If it is, the probability for an attested classes (i.e., non-escape class labels) is equal to its label count divided by the total count (that's the sum of the counts of all attested labels plus the count for the escape label) 320 and 325. If all class labels are attested 330, the labels and their associated probabilities can be returned immediately 335. If not, the escape class probability is computed as the escape count divided by the total count 340; and all computed class probabilities are saved for subsequent return 345. This process 305 is repeated until every subinstance, up to the zero-length subinstance, of the incoming instance have been examined 350. Similar statistics for further subinstances are needed to compute the probabilities of any missing class labels. These are computed 360. Once the probabilities of all labels have been computed, the entire set of class labels and their associated probabilities are returned 365. 3d: Computing probabilities for unattested label classes Once the probabilities for the attested labels for the longest matching instance of subinstance has taken place, a set of missing (unattested) labels can be identified 370. This is the difference between the full set of all possible labels and the set of attested labels for the given match. Each of the missing labels is processed in turn 372 and 374. This process first computed the escape probability for the longest matching subinstance 376. Next each shorter subinstance is scanned in turn 378. If the missing label is found in that entry 380, its probability is multiplied times the product of all preceding escape probabilities 382 and the class label and its probability are stored 384. If the missing label is not found, then the escape probability of that entry is multiplied by the product of all preceding escape probabilities 386. Note that this process must ultimately terminate with a matching class label because the "zero-order" instance contains has all attested labels. If there still remain more labels 388, each one is submitted in turn 390 to the same process 374 as the first label. When all labels have been processed, the set of missing class labels and their associated probabilities are returned 392.

FIG. 3e: Statistical Prediction (Method D)

Statistical prediction using Method C and Method D differ in only one respect: how some of the frequency mass from the attested class labels is assigned to the escape (unattested) label. Method C computes the frequency count of each attested label; increments the escape count by one for each attested label; and computes the total count as the sum of frequency counts for all labels, attested and escape. Method D, on the other hand, increments the escape count by ½ for each attested label. The probability for an attested class label is computed by multiplying the class count by two and then subtracting one as its numerator. This is divided by a denominator of two times the total count. The probability for the escape label is computed as the number of types (unique labels, the same count used by Method C) divided by two times the total count. In all other respects, the statistical prediction processes Method C and Method D are exactly identical. In other words, in FIG. 3e, boxes 420 and 440 correspond to FIG. 3c, boxes 320 and 340, with different calculations for attested class probabilities and escape probability.

It will be apparent to one of skill in the art that described herein is a novel apparatus, system and method for an apparatus, system and method for an adaptive or static machine-learning classifier using prediction by partial matching (ppm) language modeling. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A computer system for an adaptive or static machine-learning classifier using prediction by partial matching (PPM) language modeling, the computer system having a readable and accessible storage medium, at least one processor and a user interface all interconnected, the computer system comprising;
   an instance base interconnected to a PPM classifier training module, the PPM classifier training module comprising;
      an information salience module;
      a subinstance generation module;
      a statistics module; and
      a minimization modules;
   where the PPM classifier training module is structured and arranged for
      generating a plurality of instances each having at least one attribute, with a feature value and a class label for each of said at least one attribute,
      computing information saliences for each said at least one attribute;
      recording said saliences for a prediction element; and
      ordering said instances according to said saliences; and
   a PPM classifier data storage interconnected to the PPM classifier training module and a PPM classifier prediction module, the PPM classifier prediction module comprising;
      a symbolic lookup module; and
      a statistical lookup module;
   where the PPM classifier prediction module is structured and arranged for categorizing the plurality of instances according to a predetermined salience value.

2. The system according to claim 1, where the PPM classifier training module further includes a batch training submodule having software with a set of instructions for:
   generating at least one subinstance for each instance;
   counting said instances and said subinstances;
   generating a set of escape class labels and respective counts;
   generating total count of said instances, said subinstances and said respective counts of the set of escape labels; and
   generating complete symbolic classifier data.

3. The system according to claim 2, further comprising removing a least salient feature from each instance.

4. The system according to claim 3 further comprising determining whether an instance previously exists having a least salient feature removed therefrom.

5. The system according to claim 4 further comprising determining whether a class label has been attested.

6. The system according to claim 5, further comprising incrementing the class label and the total count for the instance with a least salient feature removed by 1.

7. The system according to claim 5, further comprising adding the class label with a count of 1, incrementing the escape count by 1 and incrementing the total count by 2.

8. The system according to claim 4, further comprising determining whether the length of instance having a least salient feature removed is greater than zero.

9. The system according to claim 4 further comprising adding a supplemental instance having a class label with a count of 1, an escape count of 1 and a total count of 2.

10. The system according to claim 1, where creating subinstances includes creating "L" length subinstance and "L−1" length subinstances.

11. The system according to claim 10, further comprising removing a least salient feature from an end of each instance.

12. The system according to claim 11, further comprising determining the frequency of class labels for L length subinstances and L−1 length subinstances.

13. The system according to claim 12, further comprising determining whether the most frequent class of L length subinstances is equivalent to the most frequent class of L−1 length subinstances.

14. The system according to claim 13, further comprising removing the L length subinstances.

15. The system according to claim 1, further comprising selecting a prediction type from the group consisting of symbolic and statistical.

16. The system according to claim 15, further comprising selecting a statistical prediction type from the group consisting of a first method or a second method.

17. The system according to claim 15, further comprising whether each instance has the least salient feature removed.

18. The system according to claim 17, further comprising removing a lowest salience feature from each instance.

19. The system according to claim 18, further comprising determining whether each instance contains any remaining features.

20. The system according to claim 19, for each instance, attesting a class and equating a class probability with a class count divided by the total count.

21. The system according to claim 20, further comprising determining an escape probability.

22. The system according to claim 21, further comprising determining whether all classes have a positive count.

* * * * *